(No Model.)
A. E. COHN & G. A. MERRILL.
SEWER TRAP.
No. 403,459.    Patented May 14, 1889.
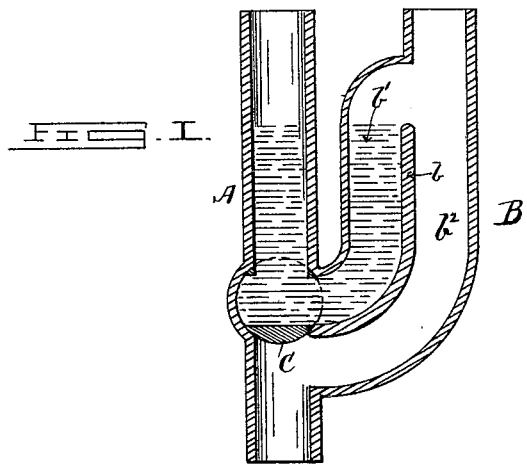
FIG. I.
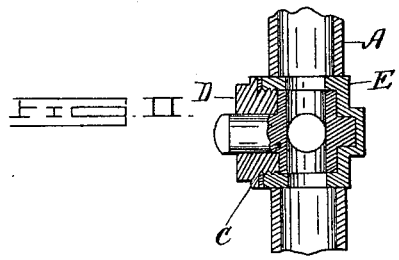
FIG. II.
Witnesses:—
Chas. S. Kalb
O. S. Buchman
Inventors:—
Abram E. Cohn
and Geo. A. Merrill,
By J. M. Kalb Attorney

UNITED STATES PATENT OFFICE.

ABRAM E. COHN AND GEORGE A. MERRILL, OF SAN FRANCISCO, CALIFORNIA.

SEWER-TRAP.

SPECIFICATION forming part of Letters Patent No. 403,459, dated May 14, 1889.

Application filed July 2, 1888. Serial No. 278,818. (No model.)

*To all whom it may concern:*

Be it known that we, ABRAM E. COHN and GEORGE A. MERRILL, citizens of the United States, residing at San Francisco, in the county of San Francisco and State of California, have invented certain new and useful Improvements in Sewer-Traps; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to sewer-traps, and has for its object the provision of a ventilated sewer-trap having a plug or valve constructed and arranged to flush the trap directly into the drain.

A trap constructed according to our invention combines advantages in the way of discharging large articles and freedom from choking and clogging up as well as in points of effective ventilation and flushing. Our trap is produced by forming or securing upon the sewer-pipe or drain an elbow having a suitable partition or walls which form the dam and separate the trap branch from a passage which constitutes the overflow-pipe as well as the gas-escape pipe, and by placing a suitable plug in the sewer or drain-pipe, which may be turned to close the drain-pipe below its connection with the elbow branch of the trap or opened to permit the water to pour down and flush the drain. The gas and overflow pipe or passage connects with the drain below the plug or cut-off and may be carried to any desired height above the dam.

The following detailed description will more fully explain the nature of our said invention and the manner in which the same is operated and used.

The accompanying drawings illustrate what we consider the best means for carrying our invention into practice.

Figure 1 is a vertical section taken across the trap and drain-pipe. Fig. 2 is a vertical section, taken transversely to Fig. 1, of the plug and drain-pipe.

Similar letters of reference indicate corresponding parts wherever they occur upon the drawings.

A is the drain-pipe.

B is the elbow which connects with the drain-pipe at a suitable point beneath the basin, bowl, or sink. This elbow is divided by a partition or dam, $b$, into two passages, $b'$ and $b^2$, the passage $b'$ being the elbow branch of the trap, and the passage $b^2$ being the combined overflow and gas escape passage. The passages $b'$ and $b^2$ communicate by separate openings with the drain-pipe.

A plug or cut-off, C, is placed in the drain-pipe in such position as to close it between the elbow branch of the trap and the overflow-passage entrance to the drain, and, when desired, to open the drain-pipe straight down to flush the trap. Thus it will be seen that effective ventilation is afforded to the trap by a very simple construction of parts, and the same part is utilized both as an overflow and gas passage, and that the discharge of the basin or sink is through the branch $b'$ and down the overflow and gas pipe at all times except when the trap and sewer-pipe beneath it are to be flushed, and that when the trap is to be flushed both the drain-pipe A and branch $b'$ may be opened by turning the plug C in one direction, which will give direct and free flushing out of both the main pipe and branch $b'$, or the branch $b'$ may be closed and pipe A opened by turning the plug in the opposite direction. In the latter case the trap will be resealed immediately upon turning the plug back into the position shown in Fig. 1, thus preventing the discharge of any gas through pipe A, while the gas-pipe $b^2$ remains always open for the direct escape of gas.

It will be observed that the plug C is not opened to permit the emptying of the basin, bowl, or sink to which the pipe A is connected above, but only to flush the trap. This is for the reason that the water discharges over the dam normally and freely when flowing from the sink, basin, or bowl above.

It will also be observed that the gas-passage $b^2$ affords a direct and continuous discharge for the gas entirely disconnected from the bowl, sink, or basin and from the operating of the plug. When the plug C is turned to open the direct passage down the drain-pipe and from the passage $b'$, there will be no obstruction to the free discharge, but the passage will be of the same capacity through the valve as at any other point in the pipes.

It will also be readily seen that the trap may be flushed in a very thorough manner and completely cleared of obstructions, both in the drain and in the elbow branch of the trap, so that the liability of the trap to clog and choke will be very materially diminished. The opening of the plug makes the passage down the drain-pipe direct and straight. As shown in the drawings, we have employed a three-way cock to form the plug or cut-off C, and have placed it directly at the mouth of the elbow branch of the trap, and, as shown in full lines, it is turned to close the drain-pipe and form the base of the trap. By giving it a quarter-revolution the trap will be flushed directly into the drain below. The neck or stem of the plug extends out the side of the pipe through a removable gland, D, which is threaded into the end of the plug-case E, which is formed in drain-pipe A. The inner end or face of the gland rests upon the end of the plug C and holds it in place. It is evident, however, that some other form of cut-off may be used, and that the plug C or other cut-off need not be placed at the junction of the passage $b'$ and the drain-pipe, but may be below it. It must, however, always be above the mouth of the passage $b^2$. It will therefore follow that the passages $b'$ and $b^2$ may be separated by more than a simple partition or dam, and may be separate pipes, the pipe $b'$ connected at the top to pipe $b^2$, and both communicating with drain-pipe A, but at a distance apart.

Other modifications which do not depart from the spirit nor sacrifice the advantages of our invention will suggest themselves to those skilled in the art of sanitary plumbing.

Having thus described our invention, what we claim, and desire to secure by Letters Patent, is—

In a sewer-trap, the combination, with a soil-pipe, A, and a double-membered branch pipe having the passage $b'$ and $b^2$ and the dam $b$ between them, of a three-way valve, C, mounted in the soil-pipe at the mouth of branch $b'$, and having passage-ways through it of equal capacity with said pipe A and passage $b'$, as set forth.

In testimony whereof we affix our signatures in presence of two witnesses.

ABRAM E. COHN.
GEORGE A. MERRILL.

Witnesses:
FRANK W. MERRILL,
HORACE DERRY.